(No Model.)

J. T. DAVIS.
ICE MACHINE.

No. 268,196. Patented Nov. 28, 1882.

WITNESSES:
C. Neveux
T. Sedgwick

INVENTOR:
J. T. Davis
BY Munn & Co.
ATTORNEYS.

UNITED STATES PATENT OFFICE.

JOHN T. DAVIS, OF NEW YORK, N. Y., ASSIGNOR TO AMY K. KING, OF SAME PLACE.

ICE-MACHINE.

SPECIFICATION forming part of Letters Patent No. 268,196, dated November 28, 1882.

Application filed April 12, 1882. (No model.)

*To all whom it may concern:*

Be it known that I, JOHN T. DAVIS, of the city, county, and State of New York, have invented a new and useful Improvement in Ice-Machines, of which the following is a full, clear, and exact description.

The object of my invention is to extract and remove the latent heat from the water introduced into the molds, and thereby secure a more rapid freezing of the water. For that purpose I extract the latent heat by a separate pump and discharge it into a chamber through which a stream of water is allowed to flow. In this chamber are also separate coils of pipe used for the different menstruums employed in the freezing operation, all as set forth more particularly hereinafter.

Reference is to be had to the accompanying drawings, forming a part of this specification, in which similar letters of reference indicate corresponding parts in both the figures.

Figure 1:
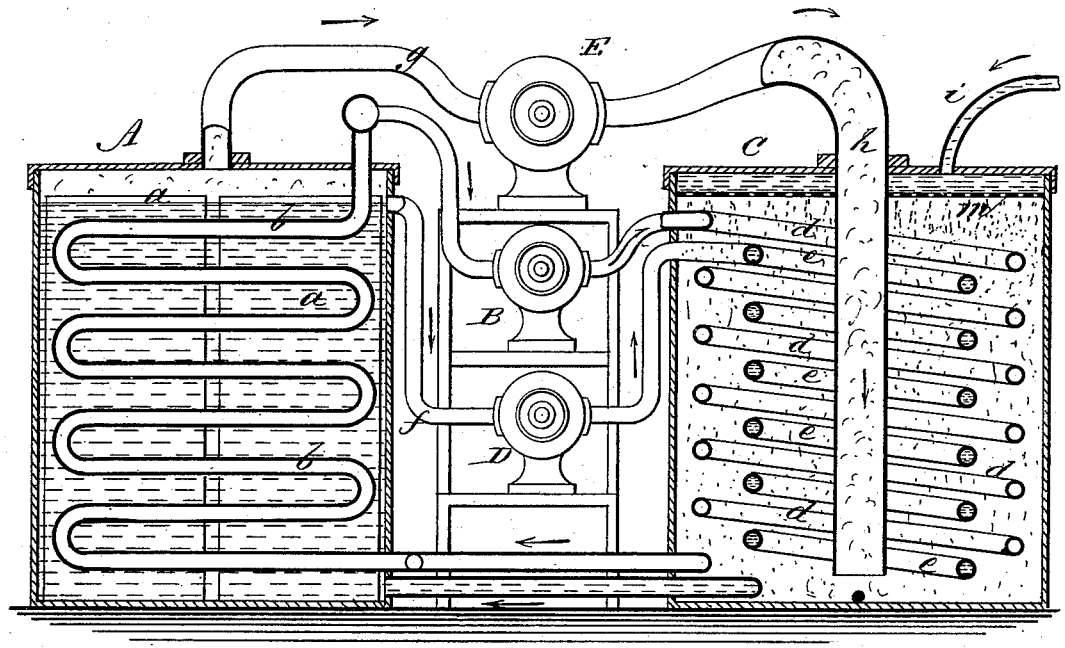
Figure 2:
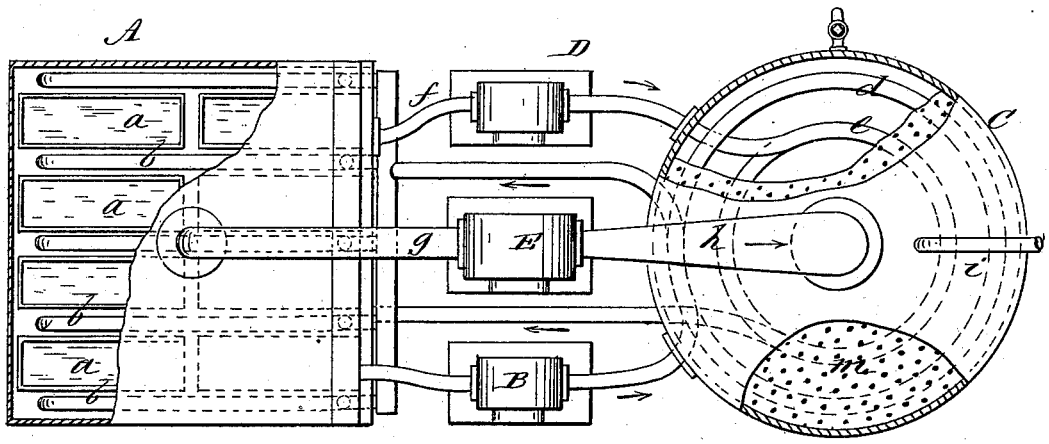

Figure 1 is a sectional elevation of my improved ice-machine. Fig. 2 is a plan view of the same, partly sectional.

A is the freezing-chamber, in which are the molds $a$. Between the molds are coils of pipe $b$, for containing the ammonia, and connected to a pump, B.

C is a chamber, containing two separate coils of pipe, $d\ e$, one of which, $d$, connects to the ammonia-pump B, while the other coil, $e$, connects to a second pump, D. The pump D is connected by a suction-pipe, $f$, with the freezing-chamber A, for the purpose of drawing off the salt-water or chloride of magnesia or other saline solution which is contained in the freezing-vessel.

E is a third pump, having its suction-pipe $g$ connected to the top of the freezing-vessel A, and provided with a discharge-pipe, $h$, that passes through the top of the chamber C and terminates near the bottom of the chamber.

$i$ is a pipe connected with the top of chamber C, for supplying cold water, and in the chamber beneath this pipe $i$ is a perforated diaphragm, $m$, for insuring equal distribution of the water. The vessel C is also provided with a discharge-pipe for the water, so that a current of cold water can be made to pass continuously through the chamber.

The pump E acts to draw off the latent heat which accumulates in the top of the vessel A, and discharges the same into the chamber C, from whence it is carried off by the current of water.

The object in making the separate coils of pipe in the chamber C is to utilize the one flow of water for both coils, and also for the purpose of absorbing the heat drawn from the freezing water by the pump. The pump acts to keep the two menstruums flowing through the separate coils while the third pump is drawing off the released caloric from the cooling water in the freezing-chamber. The flow of water thus performs the triple operation of extracting the heat from the ammonia and the saline solution and of carrying off the latent heat discharged into the water by the pump E. By this arrangement I secure a more rapid freezing of the water in the apparatus and a greater economy in the manufacture of ice.

Having thus described my invention, I claim as new and desire to secure by Letters Patent—

1. In ice-machines, the combination, with the freezing-chamber, of the coils $b$, for containing the ammonia, connected to the pump B, and the pump D, connected with the upper part of the freezing-chamber for removing the saline solution, substantially as shown and described.

2. In ice-machines, the combination of the separate coils $d\ e$, connected with the pumps B D and with the chamber C, that is provided with pipes for maintaining a current of water, substantially as shown and described.

3. In ice-machines, the pump E, connected with the upper part of the freezing-chamber A and with the water-chamber C, substantially as described.

4. In ice-machines, the pump E, connected to the upper part of the freezing-chamber for removing the latent heat, the water-chamber C, and the separate coils $d\ e$, contained within the chamber and connected to the pumps B D for removal of the ammonia and saline solution from the freezing-chamber, substantially as described, combined for operation as set forth.

JNO. T. DAVIS.

Witnesses:
GEO. D. WALKER,
C. SEDGWICK.